United States Patent [19]

Snyder

[11] 4,072,913
[45] Feb. 7, 1978

[54] FEED FORWARD PASSIVE COUPLING SYSTEM AND METHOD

[75] Inventor: Richard V. Snyder, Old Bridge, N.J.

[73] Assignee: Harvard Industries, Inc., Farmingdale, N.J.

[21] Appl. No.: 654,989

[22] Filed: Feb. 3, 1976

[51] Int. Cl.$^2$ ........................... H01P 5/12; H01P 1/16
[52] U.S. Cl. ........................................ 333/6; 333/10; 333/21 A
[58] Field of Search .................... 333/21 A, 11, 10, 6; 343/100 PE, 756, 786

[56] References Cited

U.S. PATENT DOCUMENTS

| | | | |
|---|---|---|---|
| 3,224,002 | 12/1965 | Carre | 343/100 PE X |
| 3,426,292 | 2/1969 | Seidel | 333/11 UX |
| 3,641,578 | 2/1972 | Spanos et al. | 333/11 X |
| 3,768,043 | 10/1973 | Foldes | 333/11 X |
| 3,827,051 | 7/1974 | Foldes | 343/854 X |
| 3,936,838 | 2/1976 | Foldes | 333/6 X |

Primary Examiner—Paul L. Gensler
Attorney, Agent, or Firm—Frailey & Ratner

[57] ABSTRACT

A microwave feed forward passive coupling system for separation of at least a first and a second signal portion into at least first and second signal components of differing frequencies. The first and second signal portions have a majority of the second and first components respectively and a minority of the first and second components respectively. A second sample of the second signal portion and a part of the first signal portion are combined to produce substantially the second component. In addition, a first sample of the first signal portion and a part of the second signal portion are combined to produce substantially the first component.

17 Claims, 3 Drawing Figures

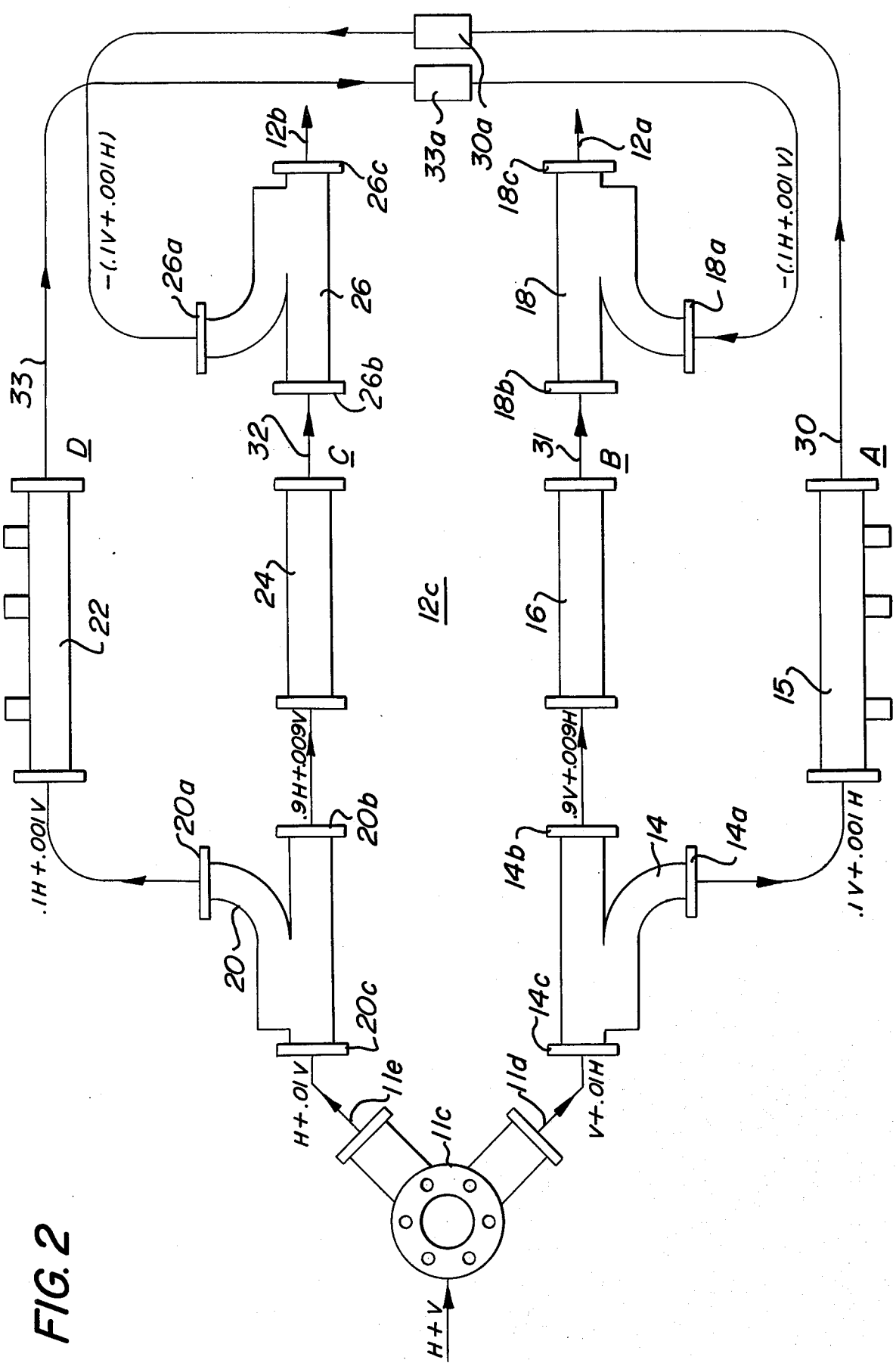

FEED FORWARD PASSIVE COUPLING SYSTEM AND METHOD

Background of the Invention

A. Field of the Invention

This invention relates to the field of feed forward cancellation systems.

B. Prior Art

Feed forward cancellation systems are known in the art and are described, for example, in U.S. Pat. Nos. 1,686,792; 2,748,201; 3,426,298; and 3,542,301 and in H. Seidel, "A Microwave Feed-Forward Experiment" Bell System Technical Journal, Vol. 50, November, 1971, page 2879, H. Seidel, "A Feed Forward Experiment Applied to an L-4 Carrier System Amplifier," IEEE Trans Commun. Tech, COM-19, No. 3, June, 1971, page 320–325. However, such cancellation systems have been limited to the cancellation of interference generated with respect to a single input signal. Signals are known which comprise two components which are required to be isolated or separated one from the other. Such two component signals may comprise signals which have both horizontally and vertically polarized components.

In a typical ground to space communication system, a horizontally polarized component may be a transmitted signal from the ground station while the vertically polarized component may be a receive signal from a communication satellite. In another example, the horizontally polarized component may originate from one transmitter while the vertically polarized component may originate from another transmitter. Both components may be received on a single line and it is desired to separate these components one from the other.

It has been known to separate two components of a signal by means such as filtering, phase discrimination, amplitude limiting and level detecting. However, depending upon the degree of separation required, such prior methods have left much to be desired since they have resulted in insertion loss, complexity and relatively high costs. Specifically, there are basic limitations on the amount of separation that may be obtained from these prior methods. For example, if the required amount of separation is great enough, then the complexity of the system and the resultant insertion loss increases to a value where the signal level is below the effective receiver threshold. Thus, where the components are substantially close to each other in frequency or amplitude and are of small relative values, any use of a filter would degrade the signal to noise ratio below the receiver threshold.

Other signals which have two components may be signals generated using biphasic modulation where one component has a constant relative phase of 0° while the second component is shifted by a constant 180°. Accordingly, the signals are maintained at the same amplitude and different only in their relative phase characteristics. Another example may be found in which two signals are maintained at the same relative phase but different amplitude and quantized to two specific levels for purposes of two level amplitude modulated transmission. Thus, the signal would comprise one component at a first amplitude and another component at another amplitude.

SUMMARY OF THE INVENTION

A feed forward passive coupling system for separation of at least a first and a second signal portion into at least first and second signal components. The first and second signal portions have a majority of the second and first components respectively and a minority of the first and second components respectively. In a first means there are combined a predetermined part of the first signal portion to produce substantially the second component. In a second means there are combined a predetermined first sample of a first signal portion and a predetermined part of the second signal portion to produce substantially the first component.

BRIEF DESCRIPTION OF THE DRAWINGS

FIG. 2 illustrates in block diagram form, a feed forward passive coupling system in accordance with the invention.

DETAILED DESCRIPTION

Figure 1:
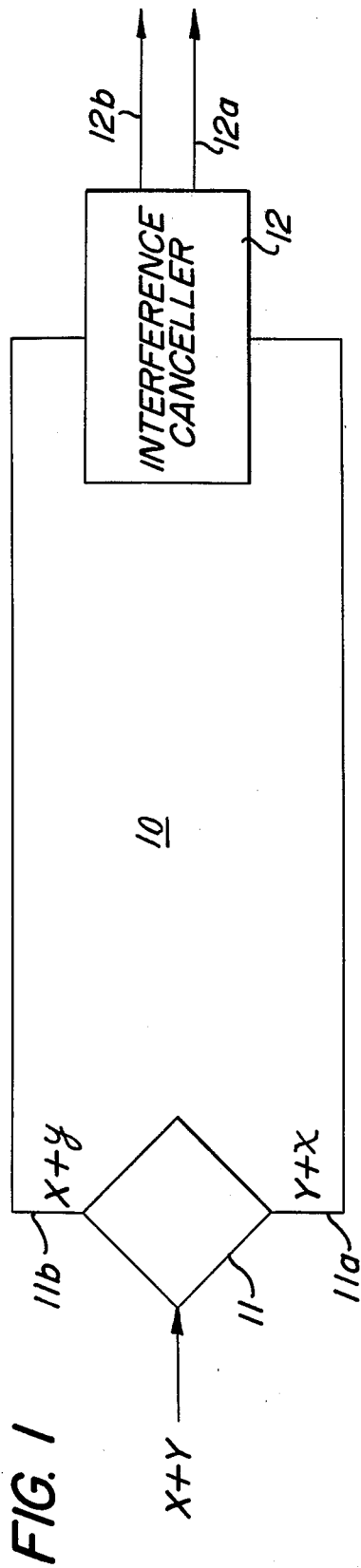
FIG. 1 illustrates in block diagram form, a generalized feed forward coupling system for separating two signal components.

Referring now to FIG. 1, there is shown in general block diagram form a feed forward passive coupling system 10 for separating two signal components generally referred to as X, Y from a received signal X+Y. Components X, Y may be two differing frequencies of any value including one value being D.C. Signal X + Y is applied to a signal separator 11 which is effective to separate signal 14 so a first signal portion X + $y$ is produced on line 11$b$ while second signal portion Y + $x$ is produced on line 11$a$. It will be understood that on line 11$b$, "$y$" is effectively interference and is a small portion of "Y". Similarly, on line 11$a$, "$x$" is effectively interference and is a small portion of "X".

As previously described, the signal applied to signal separator 11 may be any signal of two components that can be separated into two signal portions each of which contains a majority of a respective one of the components. Alternatively, lines 11$a$, $b$ may be two separate sources of signal portions each of which contains a majority of a respective one of the two components. Thus, whatever the source, line 11$b$ has a signal portion with a majority of the X component which line 11$a$ has a signal portion having a majority of the Y component.

Lines 11$a$, $b$ are applied to interference canceller 12 which is effective to produce on line 12$a$ signal in which the minority component $x$ has been attenuated. Similarly, on line 12$b$, interference canceller 12 is effective to produce a signal in which the minority component $y$ has been attenuated. In this manner, the isolation between the two signal components X and Y has been substantially increased.

As shown in FIG. 2, the received signal has components H and V of two differing frequencies which correspond to the previously described X and Y. Signal components H and V may be horizontally and vertically polarized microwave signals respectively transmitted by a horizontally polarized antenna and a vertically polarized antenna. The feed forward coupling system of FIG. 2 is effective to produce at respective outputs 12$a$, $b$ substantially the frequency components V and H.

Accordingly, received signal expressed as H + V, is applied to signal separator or Orthomode (orthogonal mode) transducer 11c. Transducer 11c has 20 db isolation and produces by means of polarization discrimination first and second signal portions V + 0.01H on line 11d and H + 0.01V on line 11e. It will be understood that the first and second signal portions no longer have any polarization information. In manner similar to that described with respect to FIG. 1, lines 11d, e may be from any source of first and second signal portions each of which contains a majority of respective one of the two components.

Lines 11d, e are applied to input couplers 14, 20 respectively which produce the signals necessary for four channels A-D of interference canceller 12c. More particularly, a first signal portion is applied to an input 14c of the main arm of a 10 db input coupler 14 of channel B. A first sample of the first signal portion is coupled out at an output 14a of an auxiliary arm of coupler 14. The first sample has a value 0.1V + 0.001H and is applied to a variable attenuator 15 which also effectively operates as a phase shifter. The output of device 15 is coupled to a line 30 with the line having a 180° twist 30a which is effective to phase shift the foregoing first sample which is then applied into an input 26a of a normally coupled arm or auxiliary arm of output directional coupler 26 of channel C. Device 15 is effective to provide small amounts of phase shift and attenuation for the reasons later to be described.

In similar manner, the second signal porton H + 0.1V is applied to an input 20c of the main arm of a 10 db input coupler 20 which is effective to couple out a second sample of the second signal portion at an output 20a of an auxiliary arm of coupler 20. This second sample has a value 0.1H + 0.001V and is coupled to a variable attenuator 22 of channel D which also effectively operates as a phase shifter. The output of device 22 is applied to a line 33 which is phase shifted by a 180° twist 33a and is then applied into an input 18a of an auxiliary arm of output coupler 18 of channel B.

An output 14b of the main arm of coupler 14 provides a part or remainder signal of value 0.9V + 0.009H on channel B which is applied through a time delay network 16 which provides a time delay at line 31 substantially equal to the total delay of the sampled first signal portion. That total delay substantially comprises the delay caused by passing through the auxiliary arm of coupler 20, plus the insertion delay provided by the auxiliary arm of coupler 18. Line 31 is applied to input 18b of the main arm of output coupler 18. As previously described, channel D provides a signal at input 18a which has a value −(0.1H + 0.001V) due to 180°twist 33a in line 33. The signal applied to input 18a is coupled down to −(0.009H + 0.00009V) and algebraically added into the part or remainder signal applied to input 18b of the main arm which is substantially 0.9V + 0.009H. The algebraic addition of these two signals produces at output 18c (output line 12a) a signal $$(0.9V + 0.009H) - 0.009H \cong 0.9V \tag{1}$$

The signal value 0.00009V is negligible and of no importance. The remainder of the signal not coupled down into the main arm of coupler 18 is absorbed by an internal load at a fourth port (not shown) of that coupler.

It will be understood that because of the negative sign of the signal coupled down by coupler 18 there is an effective subtraction of that signal from the signal on line 31.

In similar manner, output 20b of the main arm of coupler 20 provides a part signal of value 0.9H + 0.009V on channel C which is applied to a time delay network 24. Network 24 provides a time delay at line 32 which is substantially equal to the total delay of the sampled second signal portion. That total delay substantially comprises the delay caused by the signal passing through the auxiliary arm of coupler 14 plus the insertion delay provided by the auxiliary arm of coupler 26. Line 32 is applied to input 26b of the main arm of output coupler 26. The signal at input 26a is of value − (0.1V + 0.001H) as a result of 180° twist 30a. This signal is coupled down by coupler 26 to a signal value − (0.009V + 0.0009H) which is algebraically added into the signal at input 26b to provide a resultant output at output 26c (output line 12b)

$$(0.9H + 0.009V) - 0.009V \cong 0.9H \tag{2}$$

The signal value 0.00009H is of such small value as to be negligible and of no importance. The remainder of the signal not coupled out into the main arm of coupler 26 is absorbed by an internal load at a fourth port (not shown) of that coupler.

In manner similar to that previously described, there is an effective subtraction of the coupled down portion subtraction from the signal at line 32.

It will be understood that in the embodiment of FIG. 2, that output direction coupler 18 and 26 have been designed as 9.54 db couplers as compared with the 10 db input couplers 14 and 20. The 9.54 db couplers are each effective to couple out from their respective inputs 18a, 26a the required portion of the signal on the auxiliary lines as follows.

$$10 \text{ LOG } 0.1/0.009 = 9.54 \text{ db} \tag{3}$$

It will also be understood that the path loss within each of the main channels B and C is substantially equal to the path loss of the main arms of the respective two couplers. For example, in channel B, the path loss substantially comprises that provided by the main arm of input coupler 14 and the main arm of output coupler 18. This total path loss for each channel substantially comprises 0.4 db for each coupler for a total path loss of 0.8 db for both couplers of each channel.

Devices 15 and 22 provide variable attenuation as well as phase shifting. The attenuation of these devices is adjusted to compensate for any differences between channels A and D. For example, as a result of small mechanical differences such as differences in plating or coupling, compensation for differences between the channels may be necessary. Similarly, due to small variations in the fabrication of channels A and D, minor adjustment in phase shift may be required which is provided by devices 15 and 22.

As previously described, orthomode transducer 11c provides 20 db isolation for the signal components H and V. Therefore, from the theoretical viewpoint of equations 1 and 2, outputs 12a, b respectively produce values of V and H which are completely isolated from the other component. However, it will be understood that couplers 14, 18, 20 and 26 never actually operate ideally and always have some imperfections. Therefore, the practical purpose of 20 db canceller 12c is to attempt to affect complete cancellation of the 20 db interference components viz, 0.01H, 0.01V. For example, even though the ideal signal at output 12a is 0.9V as set forth in equation 1, for practical purposes, there may also be a very small value of H at output 12a, such as 0.0009H. Thus, from a practical viewpoint, interference canceller 12c produces an additional approximately 20 db isolation of the V component and of the H component over and above the 20 db isolation provided by transducer 11c thereby to provide a total isolation for each component of 40 db. Thus, there is provided an increase in isolation to approximately 40 db by interference canceller 12c with a low insertion loss of 0.8 db per channel.

It will be understood that there may be provided a further increase in isolation by cascading an additional stage of interference cancellation after canceller 12c shown in FIG. 2. Thus, the additional interference canceller 12c would provide an additional 20 db of isolation. It will also be understood that canceller 12c may be designed to provide other than 20 db isolation such as 30 db, 40 db isolation, etc., depending upon the availability of the components and the amount of the actual path loss that can be tolerated.

In addition to the above separation into two components, separation into three signal components (H, V and Q) may be provided for first through third signal portions where each signal portion has a majority of an individual one of the three components. In addition, each of the three signal portions has a minority of the remaining two components. Components H, V and Q are each of differing frequencies where D.C. is considered a frequency. For example, the three signal portions may comprise First Signal Portion ≡ V + 0.01H + 0.01Q    (4)

Second Signal Portion ≡ H + 0.01V + 0.01Q    (5)

Third Signal Portion ≡ Q + 0.01H + 0.01V (6)

Figure 3:
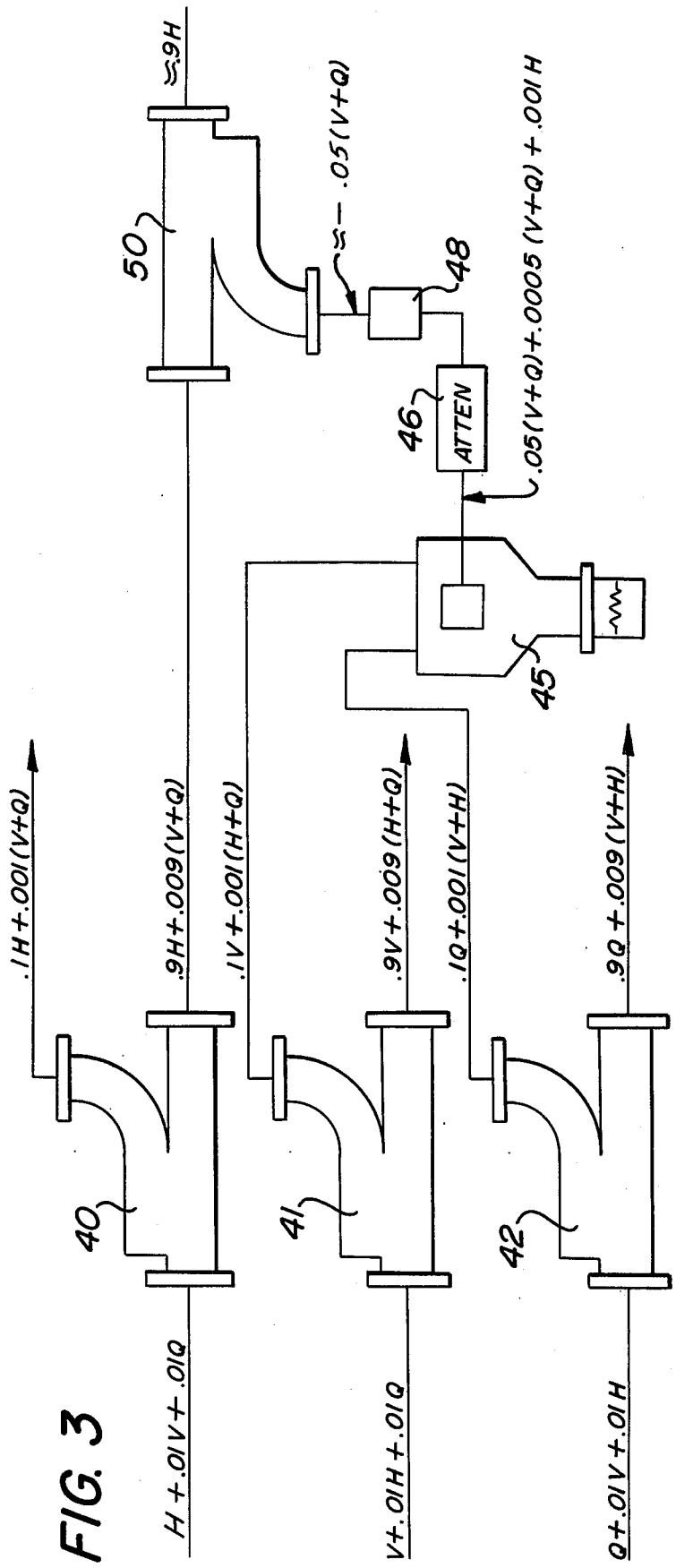
FIG. 3 illustrates in block diagram form, a further embodiment for separation into three components.

Thus, as shown in FIG. 3, first through third signal portions are applied respectively to input couplers 41, 40 and 42 which provide at main outputs and auxiliary outputs the signals as shown in FIG. 3. For purposes of simplification in addition to couplers 40-42 only the components relating to the isolation of component H have been shown in detail. It will be understood by those skilled in the art that the remaining components may be connected in like manner in order to isolate components V and Q. The components for isolating component H include a Magic Tee device 45 coupled to the output of an auxiliary arm of coupler 41 and an auxiliary arm of coupler 42. The signal at the output of device 45, of value as indicated, is applied through an attenuator and phase shifter 46 and then through a 180° twist 48 to provide a signal of value substantially equal to − 0.05 (V + Q). This signal value, applied to the auxiliary arm of an output coupler 50, is combined with the output of the main arm of coupler 40 to produce substantially a signal value of substantially 0.9H.

The following components have provided a satisfactory operation of a 8.5–9.6 GHz feed forward cancellation system of FIG. 2.

| Directional Couplers 14, 18, 20 and 26 | Model 90CT106-1 10 db coupler | Microwave Development Labs. |
|---|---|---|
| Orthomode Transducer 11c | Model 90CL-OT | Microwave Research Corp. |
| Variable Attenuators and Phase Shifter 15, 22 | Model 90AT36-1 and Model 90PE26 | Microwave Development Labs. |
| Time Delay Devices 16, 24 | Model 642 Straight piece of waveguide | Waveline |
| 180° Twist 30a, 33a | 2 Cascaded Model 690's each 90° Twist | Waveline |

(for a 8.5–9.6 GHz system)

What is claimed is:

1. A feed forward passive coupling system for separation of at least a first and a second signal portion into at least first and second signal components of differing frequencies where said first and second signal portions have a majority of said second and first components respectively and a minority of said first and second components respectively comprising first means for combining a predetermined second sample of said second signal portion and a predetermined part of said first signal portion to produce substantially said second component, means for coupling out and reversing the sign of said second sample of said second signal portion and producing a predetermined part of said second signal portion, and second means for combining a predetermined first sample of said first signal portion and said predetermined part of said second signal portion to produce substantially said first component.

2. The coupling system of claim 1 in which there is provided additional means for coupling out and reversing the sign of said first sample of said first signal portion and producing said predetermined part of said first signal portion, and said first combining means including first means for coupling down and combining said reversed sign second sample with said predetermined part of said first signal portion for producing substantially said second component.

3. The coupling system of claim 2 in which said second combining means includes second means for coupling down and combining said reversed sign first sample with said predetermined part of said second signal portion for producing substantially said first component.

4. The coupling system of claim 3 in which there is provided separating means for producing said first and second signal portion from a received signal.

5. The coupling system of claim 3 in which said additional coupling out means includes first variable attenuator and phase shifter means for selectively attenuating and shifting the phase of said first sample to compensate for imperfections in the other components of said coupling system.

6. The coupling system of claim 5 in which said coupling out means includes second variable attenuator and phase shifter means for selectively attenuating and shifting the phase of said second sample to compensate for imperfections in the other components of said coupling system.

7. The coupling system of claim 6 in which there is provided first delay means connected between said additional coupling out means and said first coupling down means for delaying said part of said first signal portion by a time delay substantially equal to the delay caused by the coupling out and sign reversal of said second sample plus the insertion delay provided by said first coupling down means.

8. The coupling system of claim 7 in which there is provided second delay means connected between said coupling out means and said second coupling down means for delaying said part of said second signal portion by a time delay substantially equal to the delay caused by the coupling out and sign reversal of said first sample plus the insertion delay provided by said second coupling down means.

9. A microwave feed forward passive coupling system for separation of at least a first and a second signal portion into at least first and second signal components of differing frequencies, said first and second signal portions having a majority of said second and first components respectively and a minority of said first and second components respectively comprising first means for coupling out and reversing the sign of a first sample of said first signal portion and producing a remainder of said first signal portion, second means for coupling out and reversing the sign of a second sample of said second signal portion and producing the remainder of said second signal portion, first means for coupling down and combining said reversed sign second sample with said remainder of said first signal portion for producing substantially one of said components, and, second means for coupling down and combining said reversed sign first sample with said remainder of said second signal portion for producing another of said components.

10. The microwave coupling system of claim 9 in which there is provided separating means for producing said first and second signal portions from a received signal.

11. The microwave coupling system of claim 10 in which said separating means comprises an Orthomode transducer having horizontally and vertically polarized signals applied as said received signal for producing said first and second signal portions.

12. The coupling system of claim 11 in which said first and second coupling out means respectively includes first and second variable attenuator and phase shifter means for selectively attenuating and shifting the phase of said first and second sample respectively to compensate for imperfections in the other components of said coupling system.

13. The coupling system of claim 12 in which there is provided first delay means coupled between said first coupling out means and said first coupling down means for delaying said remainder of said first signal portion by a time delay substantially equal to the delay caused by the coupling out and sign reversal of said second sample plus the insertion delay provided by said first coupling down means.

14. The coupling system of claim 13 in which there is provided second delay means coupled between said second coupling out means and said second coupling down means for delaying said remainder of said second signal portion by a time delay substantially equal to the delay caused by the coupling out and sign reversal of said first sample plus the insertion delay provided by said second coupling down means.

15. A method for separation of at least a first and a second signal portion into at least first and second signal components of differing frequencies where the first and second signal portions have a majority of the second and first components respectively and a minority of the first and second components respectively which comprises the steps of a. combining a predetermined second sample of the second signal portion and a predetermined part of the first signal portion for producing substantially the second component, b. coupling out and reversing the sign of the second sample of the second signal portion and producing a predetermined part of the second signal portion, and c. combining a predetermined first sample of the first signal portion and the predetermined part of the second signal portion for producing substantially the first component.

16. The method of claim 15 in which there is provided the further step of (d) coupling out and reversing the sign of the first sample of the first signal portion and producing the predetermined part of the first signal portion, and in which step (a) includes coupling down and combining the reversed sign second sample with the predetermined part of the first signal portion for producing substantially the second component.

17. The method of claim 16 in which step (c) includes coupling down and combining the reversed sign first sample with the predetermined part of the second signal portion for producing substantially the first component.

* * * * *